US012173556B2

(12) United States Patent
Hsu et al.

(10) Patent No.: US 12,173,556 B2
(45) Date of Patent: Dec. 24, 2024

(54) CORD WINDING DEVICE WITH FINE ADJUSTMENT AND CORRECTION AND WINDOW BLIND USING SAME

(71) Applicant: CHING FENG HOME FASHIONS CO., LTD., Fuxing Township, Changhua County (TW)

(72) Inventors: Sheng-Ying Hsu, Fuxing Township (TW); Ming-Chu Chiang, Fuxing Township (TW); Yu-Ping Chou, Fuxing Township (TW)

(73) Assignee: CHING FENG HOME FASHIONS CO., LTD., Fuxing Township (TW)

( * ) Notice: Subject to any disclaimer, the term of this patent is extended or adjusted under 35 U.S.C. 154(b) by 452 days.

(21) Appl. No.: 17/582,585

(22) Filed: Jan. 24, 2022

(65) Prior Publication Data

US 2023/0151684 A1 May 18, 2023

(30) Foreign Application Priority Data

Nov. 17, 2021 (TW) ................................ 110142835

(51) Int. Cl.
*E06B 9/388* (2006.01)
*E06B 9/324* (2006.01)

(52) U.S. Cl.
CPC .............. *E06B 9/324* (2013.01); *E06B 9/388* (2013.01)

(58) Field of Classification Search
CPC .... E06B 9/388; E06B 2009/322; E06B 9/324; E06B 2009/2627; E06B 9/322; E06B 9/382
See application file for complete search history.

(56) References Cited

U.S. PATENT DOCUMENTS

| | | | | | |
|---|---|---|---|---|---|
| 6,792,997 | B2 * | 9/2004 | Damiano | E06B 9/303 | 160/178.3 |
| 10,119,329 | B2 * | 11/2018 | Anderson | E06B 9/322 | |
| 10,689,904 | B2 * | 6/2020 | Huang | E06B 9/382 | |
| 11,505,989 | B1 * | 11/2022 | Chiang | E06B 9/38 | |
| 2014/0374034 | A1 * | 12/2014 | Corey | E06B 9/262 | 160/170 |
| 2015/0275573 | A1 * | 10/2015 | Huang | E06B 9/322 | 160/192 |
| 2016/0340976 | A1 * | 11/2016 | Wen | E06B 9/388 | |

* cited by examiner

*Primary Examiner* — Abe Massad
(74) *Attorney, Agent, or Firm* — Birch, Stewart, Kolasch & Birch, LLP

(57) ABSTRACT

A window blind includes a headrail, two lift cords, a blind body, a bottom rail and two cord winding devices. The two cord winding devices are respectively installed on the bottom of the bottom rail. Subject to the technical feature that the opposite ends of the two lift cords are respectively tied to the adjustment columns of the two cord winding devices, if the winding stroke is inconsistent and the blind body is folded unevenly or skewed when the window blind is folded or stretched, the adjustment column of one cord winding device can be fine-adjusted to let the respective lift cord be gradually wound and covered on the adjustment column, so that the bottom rail and the blind body can be gradually adjusted to be substantially parallel to the bottom of the headrail, thereby effectively achieving the effect of fine-tuning and correcting the blind body.

13 Claims, 10 Drawing Sheets

CORD WINDING DEVICE WITH FINE ADJUSTMENT AND CORRECTION AND WINDOW BLIND USING SAME

BACKGROUND OF THE INVENTION

1. Field of the Invention

The present invention relates to cord winding technology for window blind and more particularly, to a cord winding device with fine adjustment and correction, and window blind using the cord winding device

2. Description of the Related Art

Please refer to FIG. 1 first, which is a commonly known window blind 1 (for example: honeycomb blind or organ blind) that comprises a headrail 91, two lift cords 92, a blind body 93 and a bottom rail 94. One side of the blind body 93 is installed on the bottom of the headrail 91, and the other side of the blind body 93 is installed on the top of the bottom rail 94. One end of each of the two lift cords 92 is tied to the headrail 91, and is driven by the cord winding device in the headrail 91 to rotate in a clockwise or counterclockwise direction. The other ends of the two lift cords 92 are respectively pierced through the headrail 91, the blind body 93 and the bottom rail 94, wherein the other ends of the two lift cords 92 are respectively tied to a fastener 95 on the bottom of the bottom rail 94. In this way, the blind body 93 of the window blind 1 can be driven by the cord winding device in the headrail 91 through the two lift cords 92 to rotate clockwise or counterclockwise, thereby allowing the blind body 93 gradually achieve the effect of folding or stretching.

However, the window blind 1 disclosed above still needs improvement, i.e., since the cord length of the two lift cords 92 from the headrail 91 to the bottom rail 94 have a predetermined stroke design, if the two lift cords 92 unfortunately have inconsistent winding strokes during winding, it will indirectly cause the blind body 93 and the bottom rail 94 to appear uneven or skewed, which really makes the user quite inconvenient.

SUMMARY OF THE INVENTION

The present invention has been accomplished under the circumstances in view. In order to solve the problems mentioned in the previous technology, the present invention to provide a window blind (for example: honeycomb blind or organ blind), which comprises two cord winding devices, is used to improve the uneven folding or skewing of the blind body caused by the unfortunate inconsistency of the winding stroke when the window blind is folded or stretched.

The window blind disclosed in the present invention comprises a headrail, two lift cords, a blind body, a bottom rail, and two cord winding devices. The headrail has the bottom thereof pierced with two spaced cord holes. The bottom rail has the bottom thereof pierced with two spaced mounting holes corresponding to the cord holes of the headrail. The two cord winding devices are respectively installed on the mounting holes of the bottom rail. Each cord winding device comprises a tubular member and an adjustment column. The tubular member comprises an outer peripheral wall, an inner peripheral wall opposite to the outer peripheral wall, a large tube portion, a small tube portion, a tube body respectively connecting the large tube portion and the small tube portion, a locking portion, an accommodating hole located on the connection between the large tube portion and the tube body of the tubular member and pierced from the outer peripheral wall to the inner peripheral wall, a annular blocking portion protruding radially inward from the inner peripheral wall near a distal end of the small tube portion, and a cord-guide hole located on said tube body near the small tube portion and passing from the outer peripheral wall to the inner peripheral wall. The locking portion has one end thereof connected to the tube body, and an opposite end thereof accommodated in the accommodating hole and protruding toward the inner peripheral wall. The adjustment column comprises a large diameter end, a small diameter end, a column body respectively connecting the large diameter end and the small diameter end, an adjustment slot recessed from a distal end of the large diameter end toward the small diameter end, a plurality of spaced limit portions recessed from the periphery of the large diameter end in the direction of the adjustment slot, a knot hole located on the column body, and a annular shoulder recessed radially from the periphery of the small diameter end. The adjustment column is pivoted in the small tube portion from the large tube portion of the tubular member by the small diameter end until the annular shoulder of the small diameter end of the adjustment column is blocked at the annular blocking portion of the small tube portion of the tubular member, so that the locking portion of the tubular member is clamped to the limit portions of the large diameter end of the adjustment column. The blind body has one side thereof set at the bottom of the headrail, and an opposite side thereof set at the bottom rail. Each lift cord has one end thereof tied to one respective cord winding device provided in the headrail after a predetermined stroke, and an opposite end thereof passed through one respective cord guide provided in the headrail, one respective cord hole, the blind body and the bottom rail and then tied to the adjustment column of one respective cord winding device, so that the two lift cords are driven by the respective cord winding devices of the headrail to be rolled or stretched.

In summary, in this way, the two lift cords are driven by the cord winding devices of the headrail to be rolled or stretched. Subject to the technical feature that the opposite ends of the two lift cords are respectively tied to the adjustment columns of the two cord winding devices, depending on the situation, you can select and fine-tune the adjustment column of the cord winding device on one side, so that one of the lift cords is gradually wound and covered on the adjustment column to indirectly drive the bottom rail and the blind body to gradually adjust to roughly parallel to the bottom of the headrail, thereby effectively achieving the effect of fine-tuning, correcting and resetting the blind body.

DETAILED DESCRIPTION OF THE INVENTION

Figure 1:
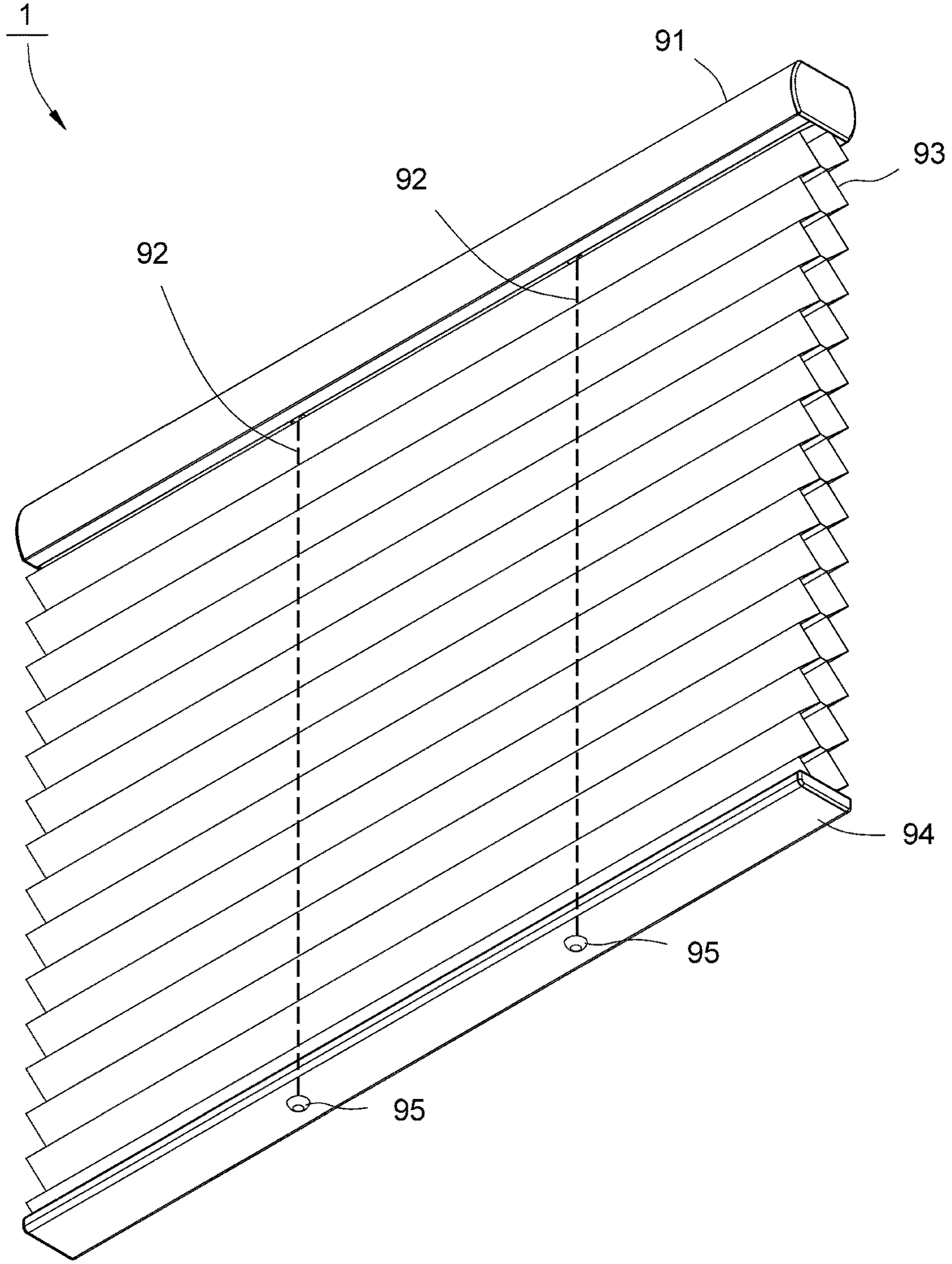
FIG. 1 PRIOR ART
FIG. 1 is an oblique top elevational view of a window blind according to the prior art.

The applicant first states here that throughout the specification, including the preferred embodiment described below and the claims in the scope of patent application, the terms related to directionality are based on the directions in the drawings. The applicant first explains here that in the entire specification, including the embodiment described below and the various claims in the scope of the patent application, the nouns related to directionality are based on the directions of the diagrams listed in the BRIEF DESCRIPTION OF THE DRAWINGS of the present application. Secondly, in the preferred embodiment and drawings to be described below, the same element numbers represent the same or similar elements or their structural features. Moreover, the detailed structure, characteristics, assembly or use, manufacturing and other methods of the present invention will be described in the detailed description of the subsequent embodiments. However, those with ordinary knowledge in the field of the present invention should be able to understand that these detailed descriptions and the examples listed in the present invention are only used to support the explanation that the present invention can actually be implemented, and are not intended to limit the patent scope of the present invention.

Figure 2:
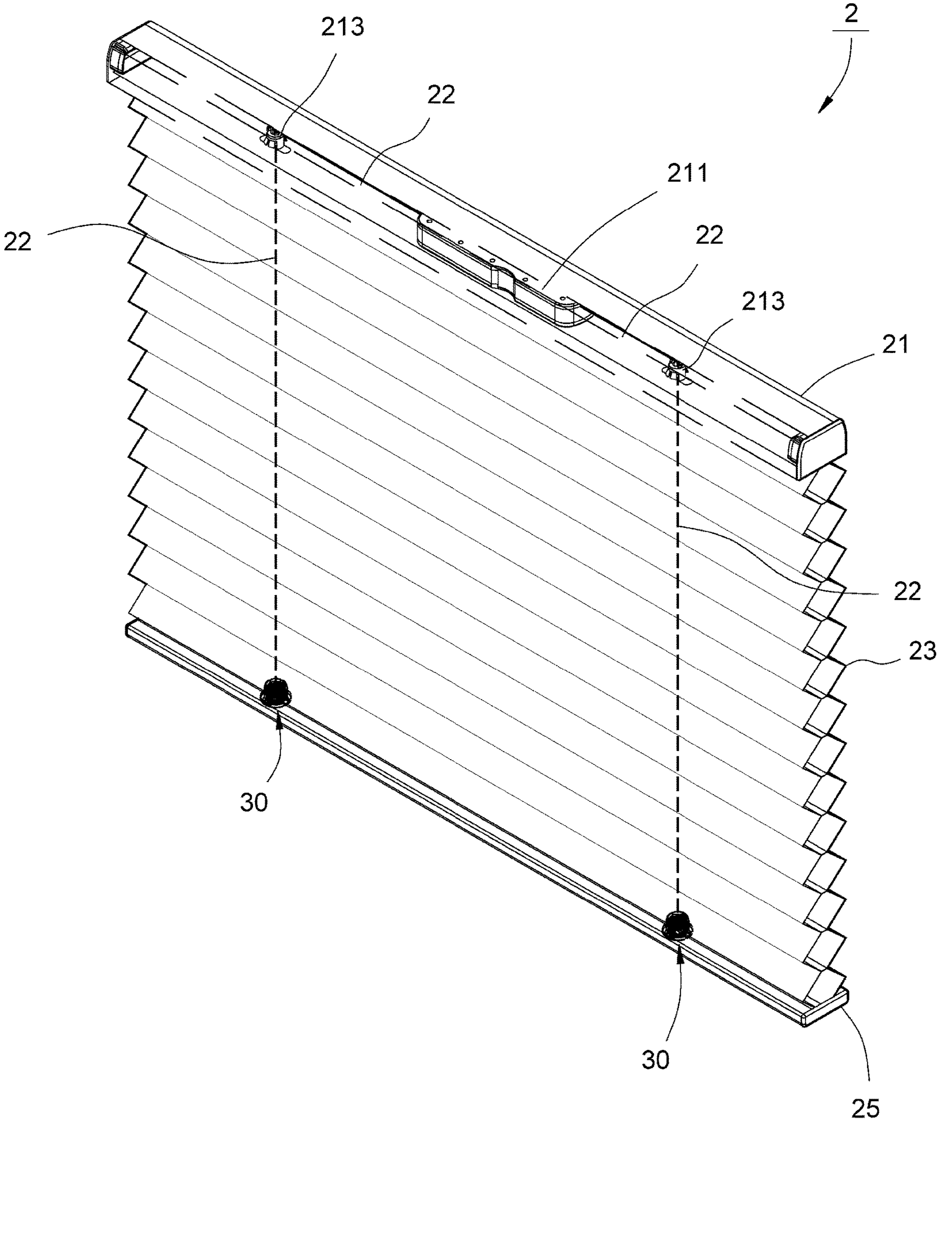
FIG. 2 is an elevational view of a preferred embodiment of the present invention, which mainly reveals that a window blind presents a smoothly expanded state.
Figure 3:
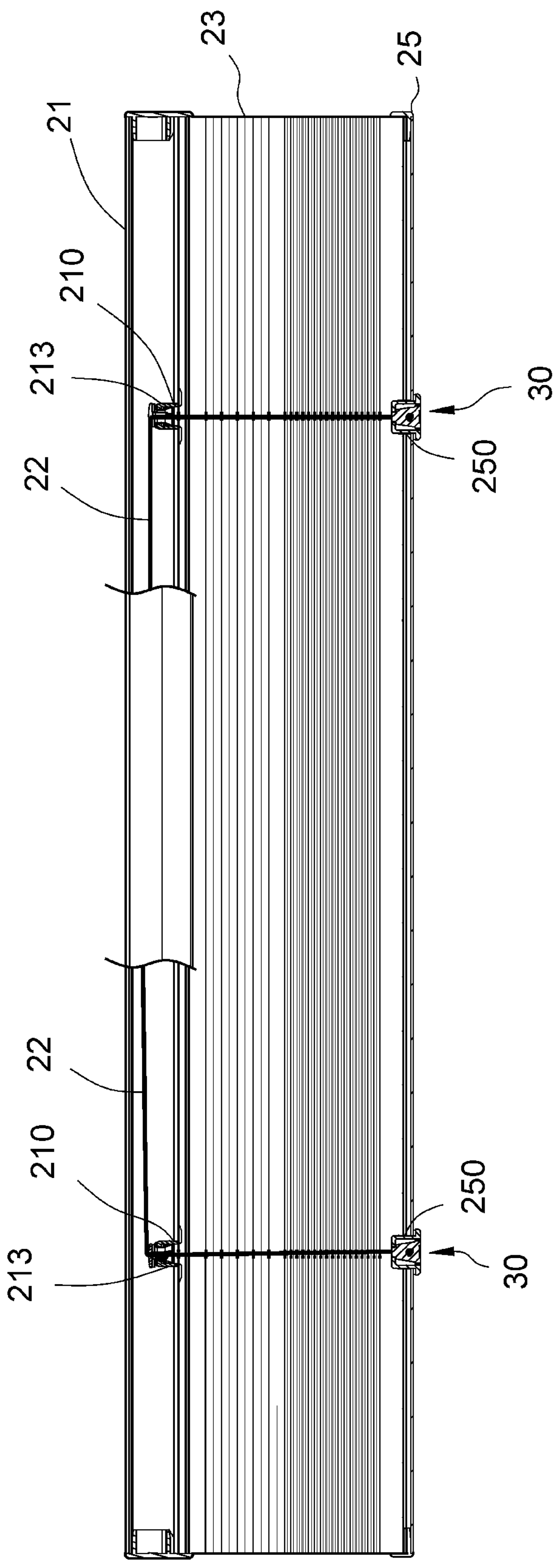
FIG. 3 is a schematic cross-sectional view of part of the components of FIG. 2, which mainly reveals that the window blind is in a smoothly folded state.
Figure 4:
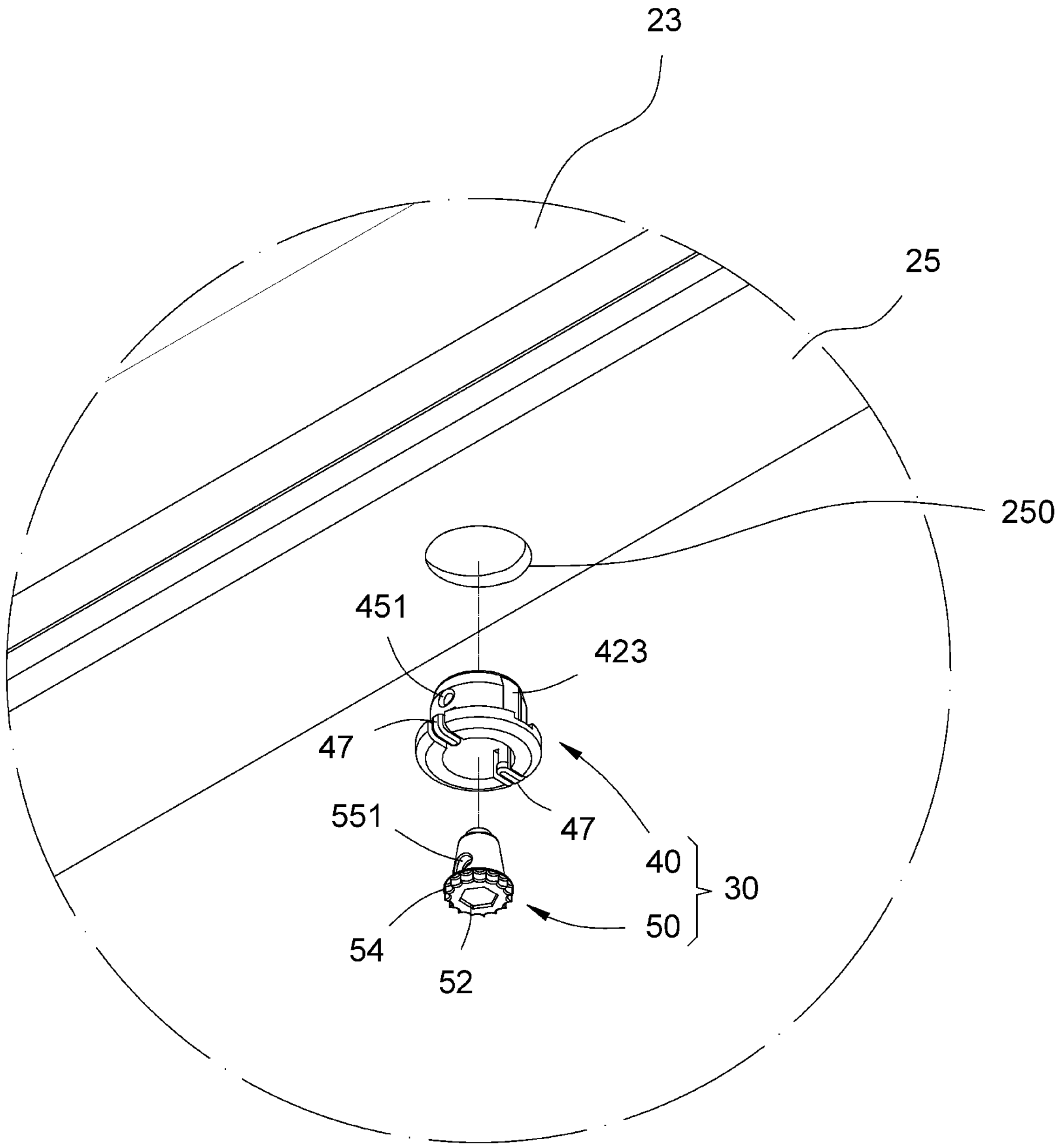
FIG. 4 is an exploded and enlarged schematic diagram of part of the components of FIG. 2, which mainly reveals the connection relationship between one of the cord winding devices of the window blind and a bottom rail.

Please refer to FIGS. 2 to 4, which are a window blind 2 (for example: honeycomb blind or organ blind) disclosed in a preferred embodiment of the present invention, which comprises a headrail 21, two lift cords 22, a blind body 23, a bottom rail 25 and two cord winding devices 30. The bottom of the headrail 21 is pierced with two cord holes 210 spaced apart. The bottom of the bottom rail 25 is provided with two spaced mounting holes 250. The two cord holes 210 of the headrail 21 are respectively corresponding to the positions of the two mounting holes 250 of the bottom rail 25, so that the two cord winding devices 30 are respectively set on the two mounting holes 250 of the bottom rail 25. One side of the blind body 23 is installed on the bottom of the headrail 21, and the other side of the blind body 23 is installed on the top of the bottom rail 25. One end of each of the two lift cords 22 is tied to one respective cord winding member 211 provided in the headrail 21 through a predetermined stroke, so that the two lift cords 22 are driven by the respective cord winding member 211 to present the state of winding or unwinding. The opposite ends of the two lift cords 22 are respectively passed through the two cord guides 213 provided in the headrail 21, the two cord holes 210, the blind body 23 and the bottom rail 25, so that the opposite ends of the two lift cords 22 are respectively tied to the two cord winding devices 30 at the bottom of the bottom rail 25.

Please refer to FIGS. 2 to 7 together, any of the cord winding devices 30 comprises a hollow tubular member 40 and an adjustment column 50 pivoted in the tubular member 40. The tubular member 40 comprises a large tube portion 41, a small tube portion 43, a tube body 45 respectively connecting the large tube portion 41 and the small tube portion 43, and two locking portions 47 connecting the tube body 45, wherein the large tube portion 41 and the small tube portion 43 are in coaxial communication. In addition, the tubular member 40 has an outer peripheral wall 401 and an inner peripheral wall 403 opposite to the outer peripheral wall 401. The connection between the large tube portion 41 and the tube body 45 is radially recessed from the outer peripheral wall 401 to form a annular shoulder 42. From the outer peripheral wall 401 of the annular shoulder 42 toward the direction of the inner peripheral wall 403, two relatively disposed accommodating holes 421 are pierced. The opening direction of the two accommodating holes 421 is intersecting with the opening direction of the large tube portion 41 and the small tube portion 43 of the tubular member 40. Preferably, the annular shoulder 42 can also only be provided with one accommodating hole 421. In addition, the outer peripheral wall 401 at the junction of the annular shoulder 42 and the tube body 45 is recessed to form a recess 423. The inner peripheral wall 403 near the mouth of the small tube portion 43 projects radially inward to form a annular blocking portion 431. The tube body 45 close to the small tube portion 43 from the outer peripheral wall 401 toward the inner peripheral wall 403 is provided with two oppositely arranged cord-guide holes 451. The opening direction of the two cord-guide holes 451 is intersecting with the opening direction of the large tube portion 41 and the small tube portion 43 of the tubular member 40. Preferably, the tube body 45 can also only have one cord-guide hole 451. One ends of the two locking portions 47 are respectively accommodated in the two accommodating holes 421 of the annular shoulder 42, and each protrude a predetermined distance toward the direction of the inner peripheral wall 403. The other ends of the two locking portions 47 are respectively connected to the tube body 45 and close to the two cord-guide holes 451. In this way, one ends of the two locking portions 47 can each present a slight reciprocating pivotal motion between the outer peripheral wall 401 and the inner peripheral wall 403 of the tubular member 40. Preferably, only one locking portion 47 can also be provided in accordance with the number of the accommodating hole 421 of the annular shoulder 42.

Figure 5:
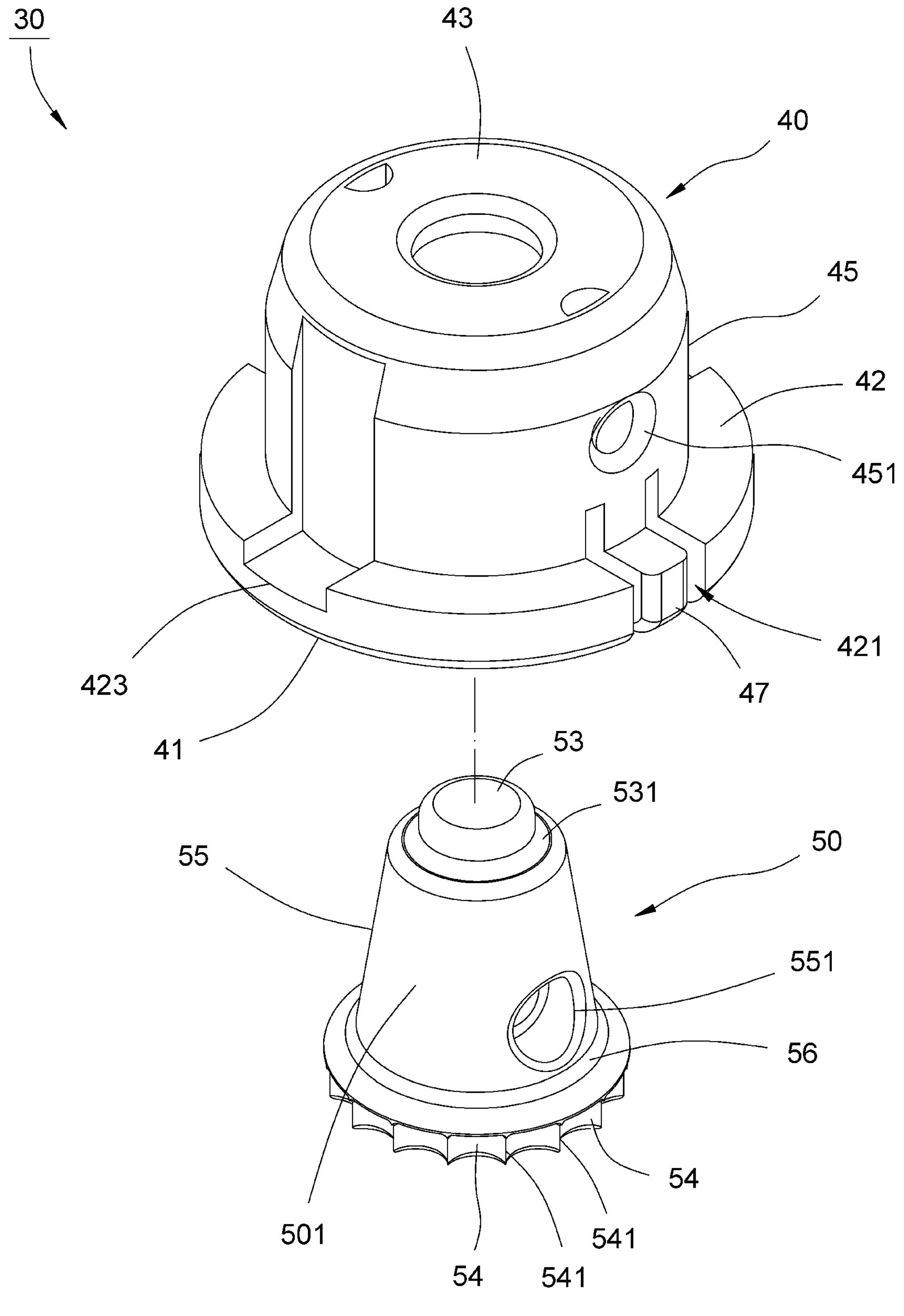
FIG. 5 is an enlarged schematic diagram of some components similar to FIG. 4, which mainly exposes the observation position of the cord winding device from another angle.
Figure 6:
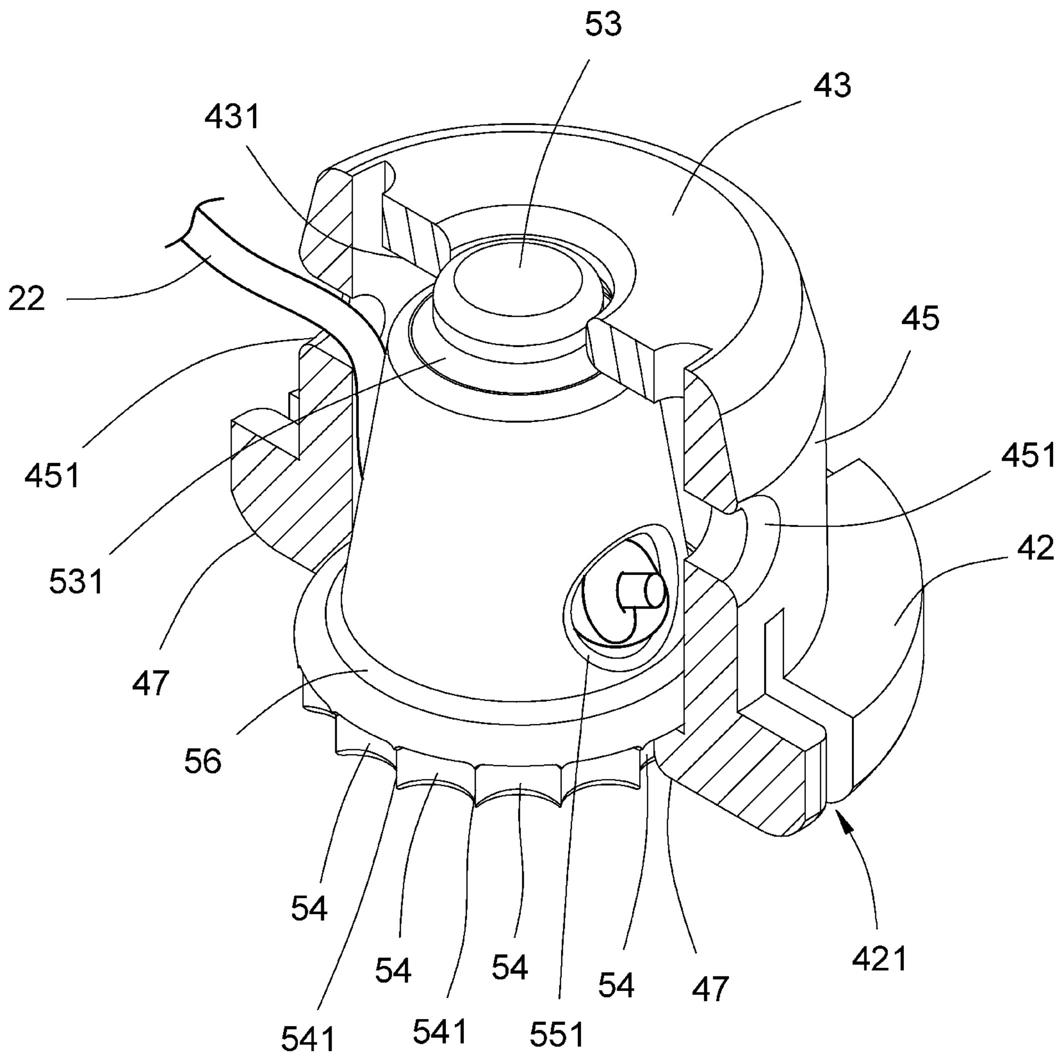
FIG. 6 is an enlarged and partial cross-sectional schematic diagram of part of the components of FIG. 2, which mainly exposes the connection relationship between one of the cord winding devices and one of the lift cords of the window blind.
Figure 7:
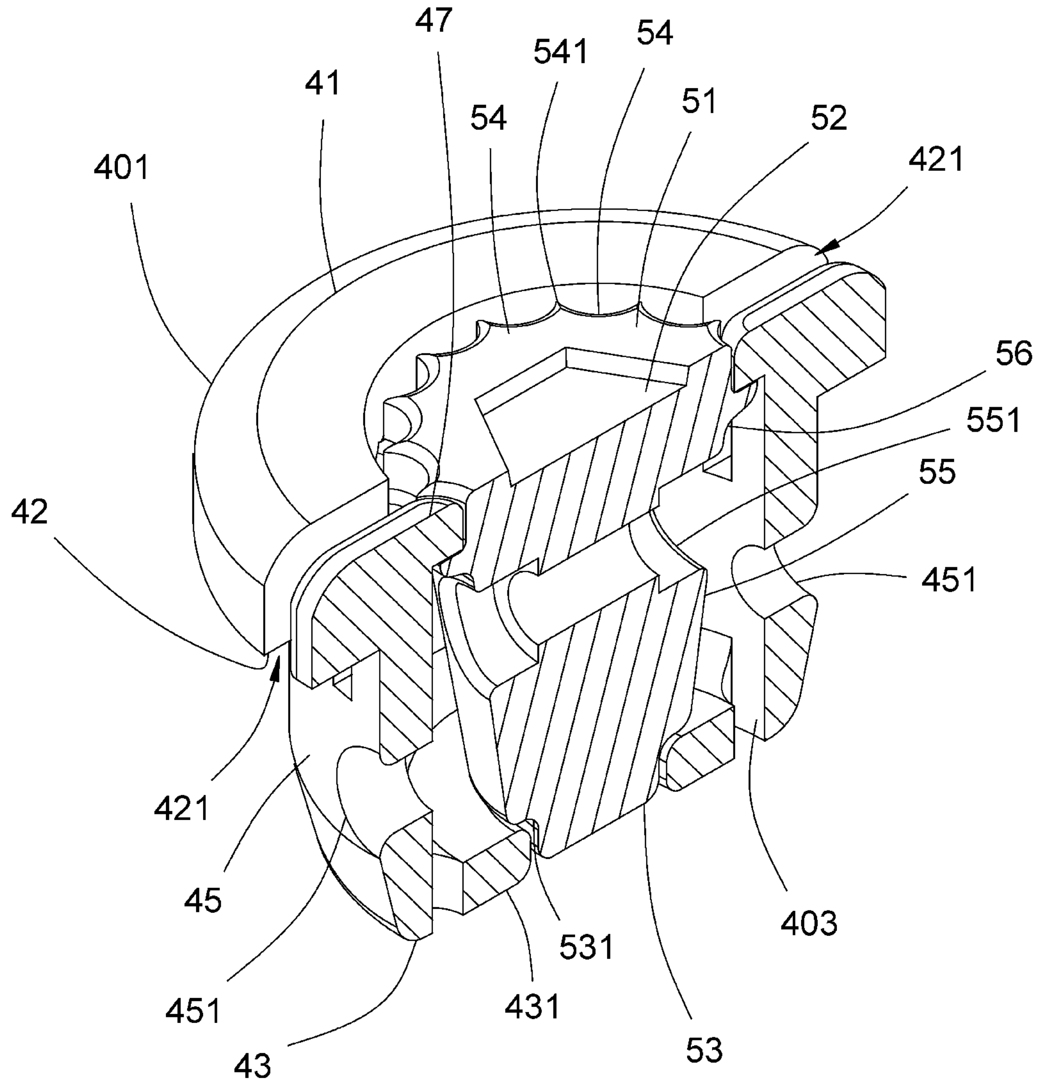
FIG. 7 is a schematic diagram of an enlarged and partial cross-sectional view of some components similar to FIG. 6, which mainly exposes the connection relationship between a tubular member and an adjustment column of one of the cord winding devices of the window blind.
Figure 8:
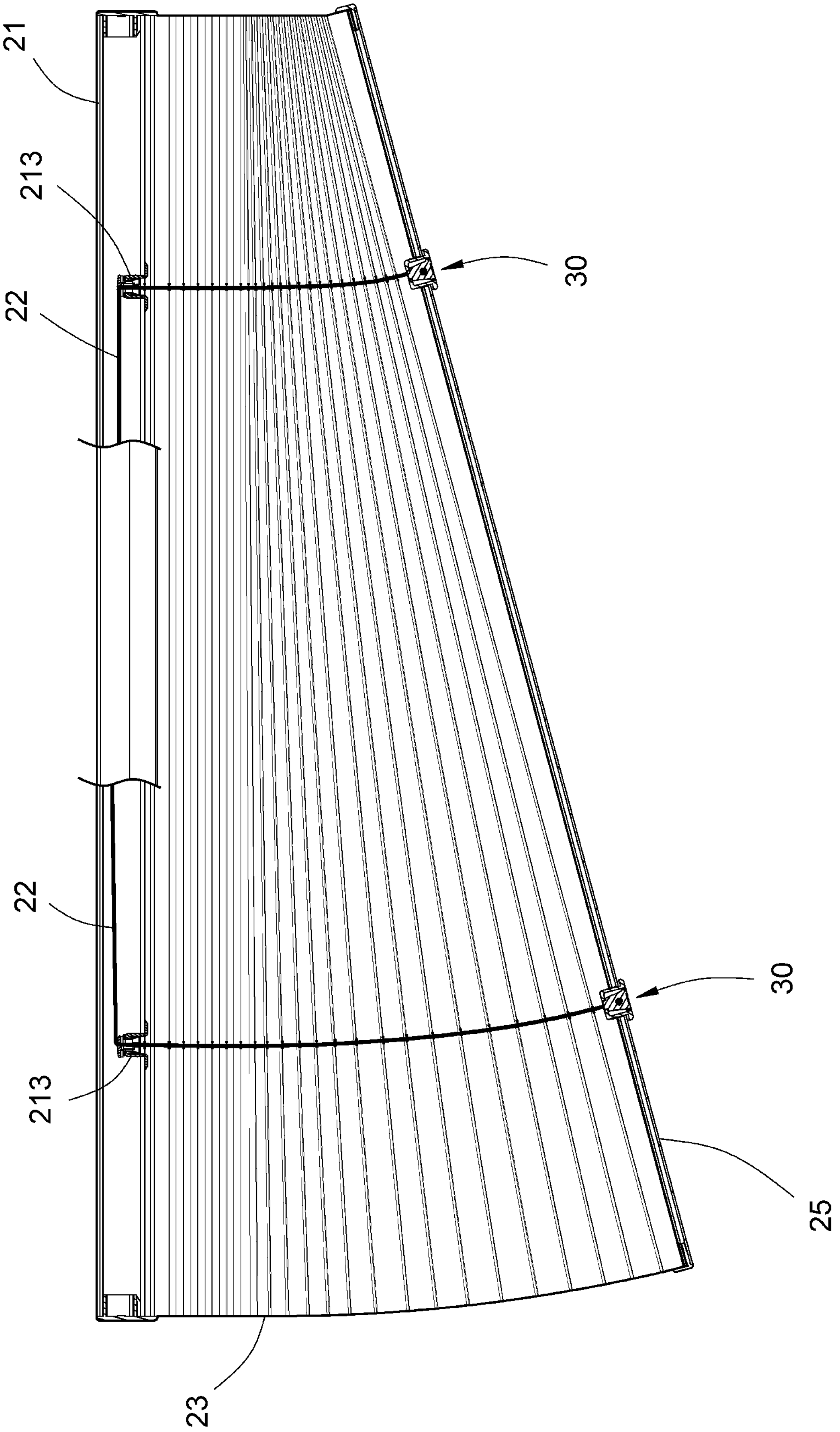
FIG. 8 is a schematic cross-sectional view of some components similar to FIG. 3, which mainly reveals that the window blind is in an unevenly folded state.
Figure 9:
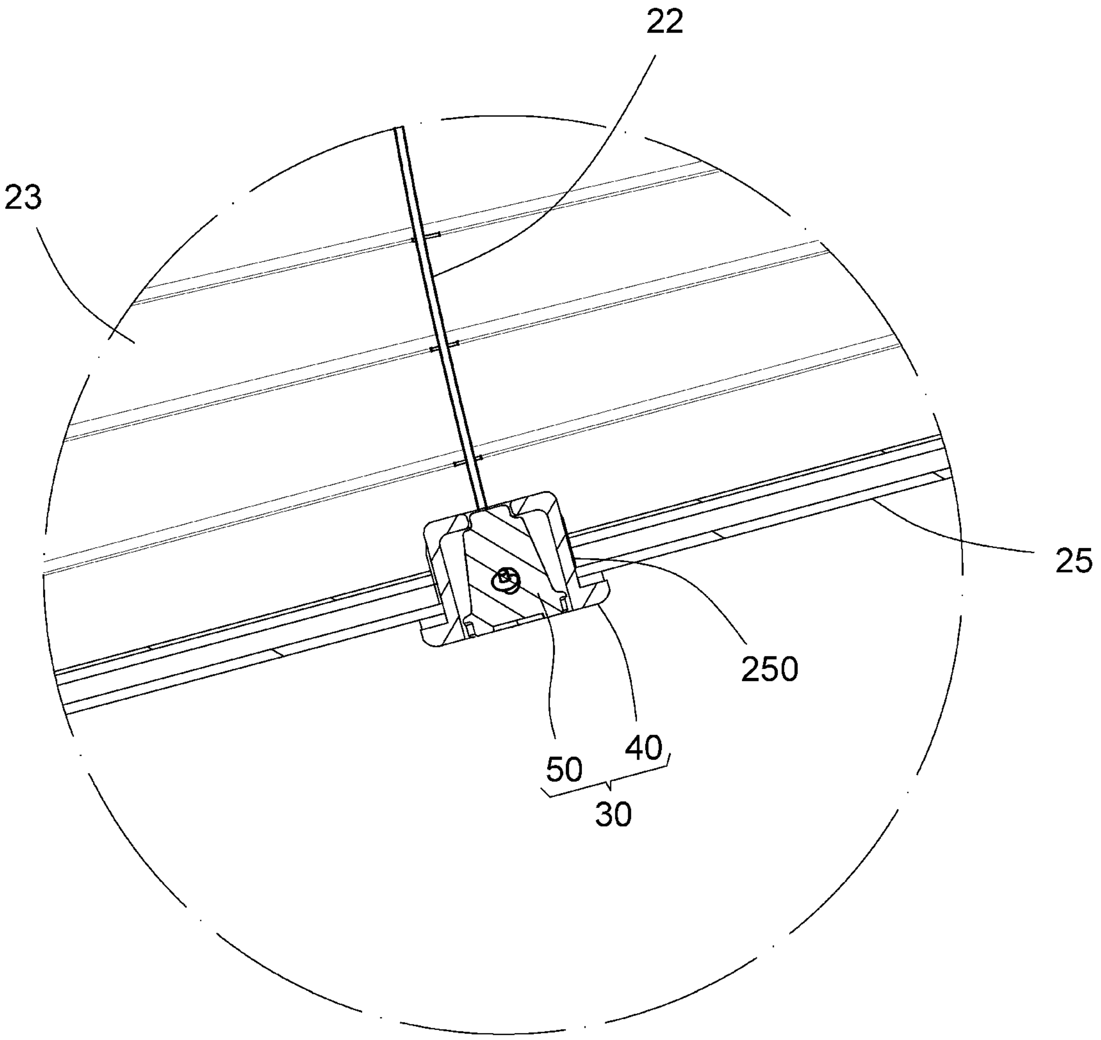
FIG. 9 is an enlarged schematic view of part of the components and a partial cross-sectional view of the components of FIG. 8, which mainly reveals the connection relationship between one of the cord winding devices and the lift cord of the window blind that has not been fine-tuned and corrected.
Figure 10:
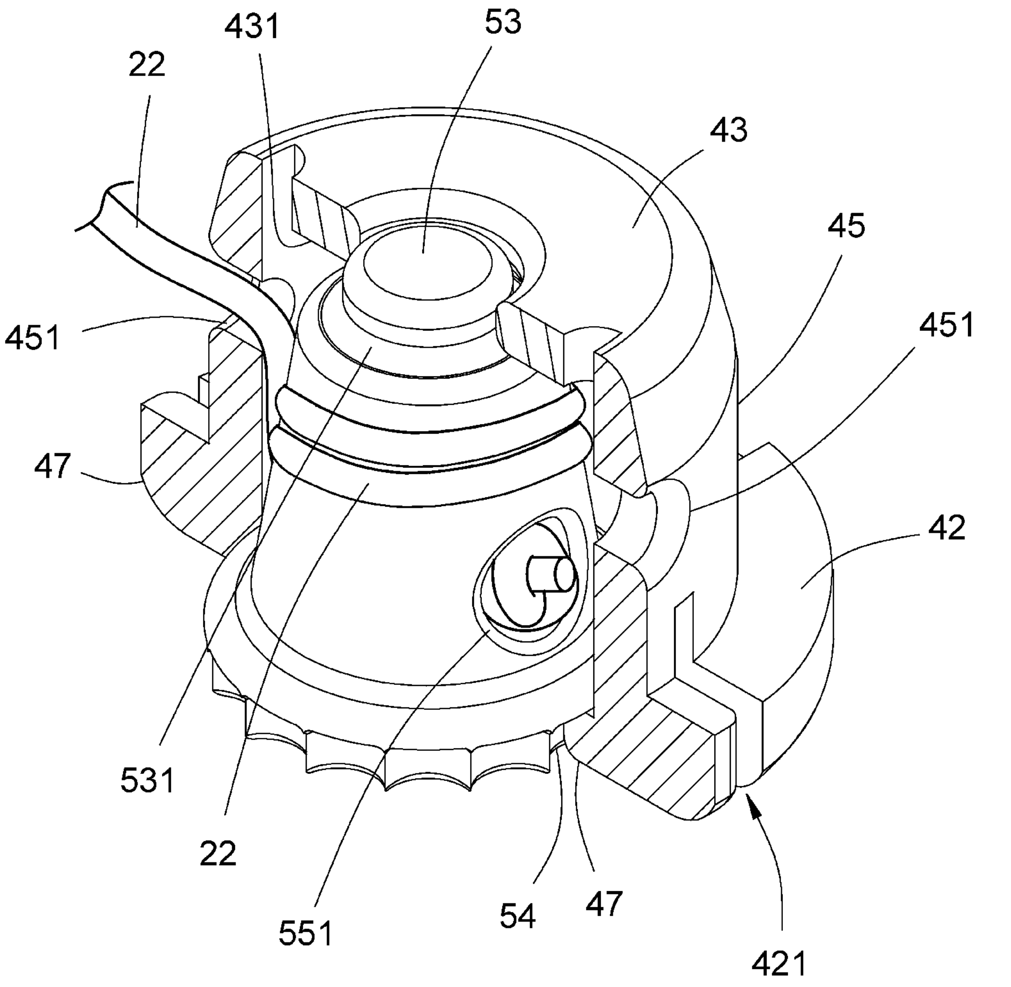
FIG. 10 is a schematic diagram of an enlarged part of the components similar to FIG. 8 and a cross-sectional view of a part of the components, which mainly reveals the connection relationship between one of the cord winding devices and the lift cord of the window blind being fine-tuned and corrected.

Please refer to FIGS. 5 to 7 together. The adjustment column 50 comprises a large diameter end 51, a small diameter end 53 coaxially to the large diameter end 51, and a column body 55 connected between the large diameter end 51 and the small diameter end 53. In addition, the adjustment column 50 has an outer peripheral wall 501. From the end of the large diameter end 51 of the adjustment column 50 toward the same axis of the small diameter end 53, an adjustment slot 52 is recessed to provide an external tool to be embedded therein. The periphery of the large diameter end 51 of the adjustment column 50 is recessed radially in the direction of the adjustment slot 52 to form a plurality of spaced limit portions 54 so that each two adjacent limit portions 54 are connected to each other by a barrier 541. The connection between the large diameter end 51 and the column body 55 is radially recessed from the outer peripheral wall 501 to form a annular shoulder 56 so that the adjustment column 50 gradually converges from the annular shoulder 56 toward the small diameter end 53. In addition, the overall outer diameter of the adjustment column 50 is less than or equal to the inner diameter of the inner peripheral wall 403 of the tubular member 40. The column body 55 of the adjustment column 50 is provided with a knot hole 551 through the column body 55. The opening direction of the knot hole 551 of the column body 55 of the adjustment column 50 is intersecting with the opening direction of the large tube portion 41 and the small tube portion 43 of the tubular member 40. The periphery of the small diameter end 53 of the adjustment column 50 is recessed radially to form a annular shoulder 531.

The above are the technical features of the window blind 2 (for example: honeycomb blind or organ blind) and its components disclosed in the preferred embodiment of the present invention. Next, we continue to disclose how the two cord winding devices 30 installed on the bottom rail 25 of the window blind 2 will cooperate with the operation mode of the overall window blind 2 and the desired effect:

First of all, please refer to FIGS. 2 to 7 together, which are to install the two cord winding devices 30 on the two mounting holes 25 of the bottom rail 25 respectively. Since the outer diameter of the tube body 45 of the tubular member 40 of any cord winding device 30 is exactly in line with the aperture size of the mounting hole 250 of the bottom rail 25, the two cord winding devices 30 can be respectively locked at the two mounting holes 250 of the bottom rail 25 by the tube body 45 of the respective tubular member 40, so as to achieve the effect of preventing any cord winding device 30 from being easily disconnected from the bottom rail 25 of the window blind 2. Preferably, subject to the technical feature that the tubular member 40 of any cord winding device 30 has the annular shoulder 42, the two cord winding devices 30 are individually blocked at the aperture periphery of the two mounting holes 250 of the bottom rail 25 by the annular shoulder 42 of the respective tubular member 40 to prevent any cord winding device 30 from being pushed into the respective mounting hole 250 of the bottom rail 25 due to the careless force applied by the personnel during the assembly.

Secondly, please refer to FIG. 4 to FIG. 7, subject to the technical feature that the overall outer diameter of the adjustment column 50 of any cord winding device 30 is less than or equal to the inner diameter of the inner peripheral wall 403 of the tubular member 40, the small diameter end 53 of the adjustment column 50 is inserted from the opening of the large tube portion 41 of the tubular member 40 into the small tube portion 43 until the annular shoulder 531 of the small diameter end 53 of the adjustment column 50 is blocked on the annular blocking portion 431 of the small tube portion 43 of the tubular member 40. Moreover, subject to the technical feature that the two locking portions 47 of the tubular member 40 correspond to and are limited to the two limit portions 54 of the large diameter end 51 of the adjustment column 50, the adjustment column 50 has to be steadily locked in the tubular member 40, so that the adjustment column 50 of any cord winding device 30 is no longer easily disconnected from the tubular member 40.

Furthermore, please refer to FIG. 2 to FIG. 7 together. The opposite ends of the two lift cords 22 of the window blind 2 are respectively inserted through the two cord guides 213 provided in the headrail 21 and the two cord holes 210, the blind body 23, and the bottom rail 25, and then respectively inserted through the cord-guide holes 451 of the tube bodies 45 of the tubular members 40 of the two cord winding devices 30, and then passed through the knot holes 551 of the column bodies 55 of the respective adjustment columns 50 and tied and fixed thereto. In this way, subject to the technical feature that the opening direction of the cord-guide hole 451 of the tubular member 40 of any cord winding device 30 and the opening direction of the knot hole 551 of the column body 55 of the adjustment column 50 are respectively intersected with the opening direction of the large tube portion 41 and the small tube portion 43 of the tubular member 40 and the opening direction of the two mounting holes 250 of the bottom rail 25, the opposite end of the lift cord 22 is first passed through the cord-guide hole 451 of the tube body 45 of the respective tubular member 40, and then tied and fixed at the knot hole 551 of the column body 55 of the respective adjustment column 50. In addition to preventing the opposite end of each the two lift cords 22 from being easily disconnected from the adjustment column 50 of the respective cord winding device 30, it also allows the adjustment column 50 of the cord winding device 30 and the respective cord winding member 211 of the headrail 21 to be ingeniously drawn to each other through the two ends of the respective lift cord 22.

Finally, please refer to FIG. 2 to FIG. 10 together. If, unfortunately, when the window blind 2 is folded or stretched, the winding strokes of the two lift cords 22 are inconsistent, which indirectly causes the blind body 23 and the bottom rail 25 to no longer be parallel to the bottom of the headrail 21, which results in uneven or skewed folding of the blind body 23, at this time, subject to the technical feature that the large diameter end 51 of the adjustment column 50 of any cord winding device 30 is recessed to form the adjustment slot 52, a matching external hand tool (that is, as shown in FIG. 4, the adjustment slot is a hexagon socket type, of course, it can also be a straight type or a cross type, etc., and the foregoing are all known techniques that can be easily replaced and are not the technical features of the preferred embodiments of the present invention, so they will not be repeated) can be inserted into the adjustment slot 52 of the adjustment column 50 of any cord winding device 30 and then rotated clockwise or counterclockwise to let the respective lift cord 22 be gradually wound and covered on the column body 55 of the adjustment column 50, and indirectly drive the bottom rail 25 and the blind body 23 to be gradually adjusted to be substantially parallel to the bottom of the headrail 21, so that the blind body 23 and the bottom rail 25 can be restored to the smooth folding or stretching again. In this way, the blind body 23 can be effectively adjusted and corrected.

In addition, please refer to FIG. 2 to FIG. 10 together. It is worth mentioning that when the blind body 23 of the window blind 2 applies a clockwise or counterclockwise force to the adjustment column 50 of one of the cord winding devices 30 to start pivoting motion, subject to the technical feature that the two locking portions 47 of the tubular member 40 of the cord winding device 30 are respectively clamped to the two limit portions 54 of the large diameter end 51 of the corresponding adjustment column 50, the adjustment column 50 is pivoted radially clockwise or counterclockwise to a predetermined position, so that the two limit portions 54 of the adjustment column 50 are limited and locked by the two locking portions 47 of the corresponding tubular member 40. In this way, it will be able to effectively prevent the adjustment column 50 from rotating clockwise or counterclockwise arbitrarily. Preferably, subject to the technical feature that each two adjacent limit portions 54 of the adjustment column 50 are connected to each other by a barrier 541, when the two locking portions 47 of the tubular member 40 are respectively restricted to any two adjacent limit portions 54 of the large diameter end 51 of the adjustment column 50, it will not easily produce radially clockwise or counterclockwise rotation.

What is claimed is:

1. A cord winding device (30), comprising:

a tubular member (40), said tubular member (40) comprising an outer peripheral wall (401), an inner peripheral wall (403) opposite to said outer peripheral wall (401), a large tube portion (41), a small tube portion (43), a tube body (45) respectively connecting said large tube portion (41) and said small tube portion (43), a locking portion (47), an accommodating hole (421) located on a connection between said large tube portion (41) and said tube body (45) of said tubular member (40) and pierced from said outer peripheral wall (401) to said inner peripheral wall (403), a annular blocking portion (431) protruding radially inward from said inner peripheral wall (403) near a distal end of said small tube portion (43) and a cord-guide hole (451) located on said tube body (45) near said small tube portion (43) and passing from said outer peripheral wall (401) to said inner peripheral wall (403), said locking portion (47) having one end thereof connected to said tube body (45) and an opposite end thereof accommodated in said accommodating hole (421) and protruding toward said inner peripheral wall (403); and an adjustment column (50), said adjustment column (50) comprising a large diameter end (51), a small diameter end (53), a column body (55) respectively connecting said large diameter end (51) and said small diameter end (53), an adjustment slot (52) recessed from a distal end of said large diameter end (51) toward said small diameter end (53), a plurality of spaced limit portions (54) recessed from the periphery of said large diameter end (51) in the direction of said adjustment slot (52), a knot hole (551) located on said column body (55) and a annular shoulder (531) recessed radially from the periphery of said small diameter end (53);

wherein: said adjustment column (50) is inserted in said small tube portion (43) from said large tube portion (41) of said tubular member (40) by said small diameter end (53) until said annular shoulder (531) of said small diameter end (53) of said adjustment column (50) is blocked at said annular blocking portion (431) of said small tube portion (43) of said tubular member (40), so that said locking portion (47) of said tubular member (40) is clamped to said limit portions (54) of said large diameter end (51) of said adjustment column (50), wherein said locking portion is configured to clamp to different ones of said limit portions such that said adjustment column is configured to be adjusted in clockwise and counterclockwise directions relative to the tubular member;

wherein the connection between said large tube portion (41) and said tube body (45) of said tubular member (40) is radially recessed from said outer peripheral wall (401) to form a annular shoulder (42), and said outer peripheral wall (401) of said annular shoulder (42) is pierced in the direction of said inner peripheral wall (403) to form said accommodating hole (421).

2. The cord winding device (30) as claimed in claim 1, wherein the end of said locking portion (47) of said tubular member (40) connected to said tube body (45) is capable of making a reciprocating pivotal motion between said outer peripheral wall (401) and said inner peripheral wall (403) of said tubular member (40).

3. The cord winding device (30) as claimed in claim 2, wherein the adjustment column has an outer peripheral wall (501) and a connection between said large diameter end (51) and said column body (55) of said adjustment column (50) is radially recessed from said outer peripheral wall (501) to form a annular shoulder (56), so that said adjustment column (50) gradually converges from said annular shoulder (56) to said small diameter end (53).

4. The cord winding device (30) as claimed in claim 3, wherein said adjustment column (50) further comprises a barrier (541) connected between each two adjacent said limit portions (54).

5. The cord winding device (30) as claimed in claim 1, wherein the adjustment column has an outer peripheral wall (501) and the connection between said large diameter end (51) and said column body (55) of said adjustment column (50) is radially recessed from said outer peripheral wall (501) to form a annular shoulder (56), so that said adjustment column (50) gradually converges from said annular shoulder (56) to said small diameter end (53).

6. The cord winding device (30) as claimed in claim 5, wherein said adjustment column (50) further comprises a barrier (541) connected between each two adjacent said limit portions (54).

7. A window blind (2), comprising a headrail (21), two lift cords (22), a blind body (23), a bottom rail (25) and two cord winding devices (30) as described in claim 1, wherein said headrail (21) has a bottom thereof pierced with two spaced cord holes (210); said bottom rail (25) has a bottom thereof pierced with two spaced mounting holes (250) corresponding to said cord holes (210) of said headrail (21); said two cord winding devices (30) are respectively installed on said mounting holes (250) of said bottom rail (25) so that said annular shoulders (42) of said tubular members (40) of said two cord winding devices (30) are respectively blocked at the aperture periphery of said two mounting holes (250) of said bottom rail (25); said blind body (23) has one side thereof set at a bottom of said headrail (21), and an opposite side thereof set at said bottom rail (25); each said lift cord (22) has one end thereof tied to a cord winding member (211) provided in said headrail (21) after a predetermined stroke, and an opposite end thereof passed through one respective cord guide (213) provided in said headrail (21), one respective said cord hole (210), said blind body (22) and said bottom rail (25) and then tied to said adjustment column (50) of one respective said cord winding device (30); said two lift cords (22) are driven by the respective said cord winding member (211) of said headrail (21) to be rolled or stretched.

8. The window blind (2) as claimed in claim 7, wherein said opposite ends of said two lift cords are respectively passed through said two cord guides (213) provided in said headrail (21), said two cord holes (210), said blind body (22) and said bottom rail (25), and then respectively passed through said cord-guide holes (451) of said tube bodies (45) of said tubular members (40) of said two cord winding devices (30), and then tied to said knot holes (551) of said column bodies (55) of said adjustment columns (50) and fixed.

9. The window blind (2) as claimed in claim 8, wherein the opening directions of said accommodating hole (421), said cord-guide hole (451) of said tubular member (40) of each said cord winding device (30) and the opening direction of said knot hole (551) of said column body (55) of said adjustment column (50) are respectively intersected with the opening direction of said large tube portion (41), said small tube portion (43) of said tubular member (40) and the opening direction of said two mounting holes (250) of said bottom rail (25).

10. The cord winding device (30) as claimed in claim 4, wherein the connection between said large tube portion (41) and said tube body (45) of said tubular member (40) is radially recessed from said outer peripheral wall (401) to form a annular shoulder (42), and said outer peripheral wall (401) of said annular shoulder (42) is pierced in the direction of said inner peripheral wall (403) to form said accommodating hole (421).

11. A window blind (2), comprising a headrail (21), two lift cords (22), a blind body (23), a bottom rail (25) and two cord winding devices (30) as described in claim 10, wherein said headrail (21) has a bottom thereof pierced with two spaced cord holes (210); said bottom rail (25) has a bottom thereof pierced with two spaced mounting holes (250) corresponding to said cord holes (210) of said headrail (21); said two cord winding devices (30) are respectively installed on said mounting holes (250) of said bottom rail (25) so that said annular shoulders (42) of said tubular members (40) of said two cord winding devices (30) are respectively blocked at the aperture periphery of said two mounting holes (250) of said bottom rail (25); said blind body (23) has one side thereof set at a bottom of said headrail (21), and an opposite side thereof set at said bottom rail (25); each said lift cord (22) has one end thereof tied to a cord winding member (211) provided in said headrail (21) after a predetermined stroke, and an opposite end thereof passed through one respective cord guide (213) provided in said headrail (21), one respective said cord hole (210), said blind body (22) and said bottom rail (25) and then tied to said adjustment column (50) of one respective said cord winding device (30); said two lift cords (22) are driven by the respective said cord winding member (211) of said headrail (21) to be rolled or stretched.

12. The window blind (2) as claimed in claim 11, wherein said opposite ends of said two lift cords are respectively passed through said two cord guides (213) provided in said headrail (21), said two cord holes (210), said blind body (22) and said bottom rail (25), and then respectively passed through said cord-guide holes (451) of said tube bodies (45) of said tubular members (40) of said two cord winding devices (30), and then tied to said knot hole (551) of said column bodies (55) of said adjustment columns (50) and fixed.

13. The window blind (2) as claimed in claim 12, wherein the opening directions of said accommodating hole (421), said cord-guide hole (451) of said tubular member (40) of each said cord winding device (30) and the opening direction of said knot hole (551) of said column body (55) of said adjustment column (50) are respectively intersected with the opening direction of said large tube portion (41), said small tube portion (43) of said tubular member (40) and the opening direction of said two mounting holes (250) of said bottom rail (25).

* * * * *